United States Patent [19]

Maehara

[11] 4,256,206
[45] Mar. 17, 1981

[54] DISC BRAKE

[75] Inventor: Toshifumi Maehara, Chichibu, Japan

[73] Assignee: Akebono Brake Industry Company, Ltd, Tokyo, Japan

[21] Appl. No.: 52,944

[22] Filed: Jun. 28, 1979

[30] Foreign Application Priority Data

Jun. 30, 1978 [JP] Japan .................................. 53-80052

[51] Int. Cl.³ ............................................ F16D 65/56
[52] U.S. Cl. ................................ 188/71.9; 188/196 D
[58] Field of Search .............. 188/71.9, 106 F, 196 D, 188/196 BA

[56] References Cited

U.S. PATENT DOCUMENTS 3,550,732  12/1970  Beller .............................. 188/196 D Primary Examiner—Duane A. Reger
Attorney, Agent, or Firm—Armstrong, Nikaido, Marmelstein & Kubovcik

[57] ABSTRACT

A disc brake is provided with a fluid pressure operating mechanism for a service brake and concurrently with a mechanical operating mechanism for a parking brake. A parking lever of the parking brake is connected to an adjusting bolt through a spindle and a connecting link and further connected to a piston slidable in a cylinder through a sleeve nut. The adjusting bolt is prevented from rotation by a stopper plate fixed to the cylinder. The adjusting bolt and the sleeve nut are connected by thread and provided therebetween with a stopping means of rotation which allows a forward rotation of the sleeve nut toward a disc but limits a retracting rotation of the sleeve nut from the disc. The stopping means of rotation is provided with a locking means which effectively prevents a retraction of the sleeve nut. A clearance between friction pads and the disc is automatically adjusted by the fluid pressure operating mechanism when linings of the friction pads are worn more than a predetermined amount. Thus, the parking brake is ensured of a predetermined lever stroke at all times.

4 Claims, 2 Drawing Figures

DISC BRAKE

DETAILED DESCRIPTION OF THE INVENTION

The present invention relates to a disc brake concurrently provided with a mechanical parking brake wherein, when the lever stroke of a parking brake is increased because of wearing of the linings of the friction pads, the clearance between the friction pads and the disc is automatically adjusted during a fluid pressure braking operation so that the parking brake is ensured of having a predetermined lever stroke.

A disc brake generally comprises a support being fixed to a stationary element of a vehicle, a caliper being sidably supported by the support, a disc connected to a wheel with friction pads disposed on each side on the caliper and pressing the disc at both sides so as to effect braking, and a fluid pressure cylinder operating one of the friction pads.

In contrast thereto, a parking brake normally employs a mechanical brake for the purpose of a parking operation in a long period of time instead of the fluid pressure braking operation.

As a conventional automatic adjusting device of the parking brake, there is a British Pat. No. 971,799 which discloses a clutch spring for limiting a screwing-in of a nut. However, the clutch spring does not necessarily ensure reliability since slipping may occur sometimes between the clutch spring and the nut during the operation of the mechanical brake, thereby resulting in a backward movement of the nut with a consequent increase in the parking lever stroke.

The present invention is directed to solve the drawback of the conventional automatic adjusting device in a disc brake which is provided with a fluid pressure operating mechanism for a service brake combined with a mechanical operating mechanism for a parking brake.

Further details and advantages of the invention will become apparent from the following description of a preferred embodiment with the accompanying drawings.

Figure 1:
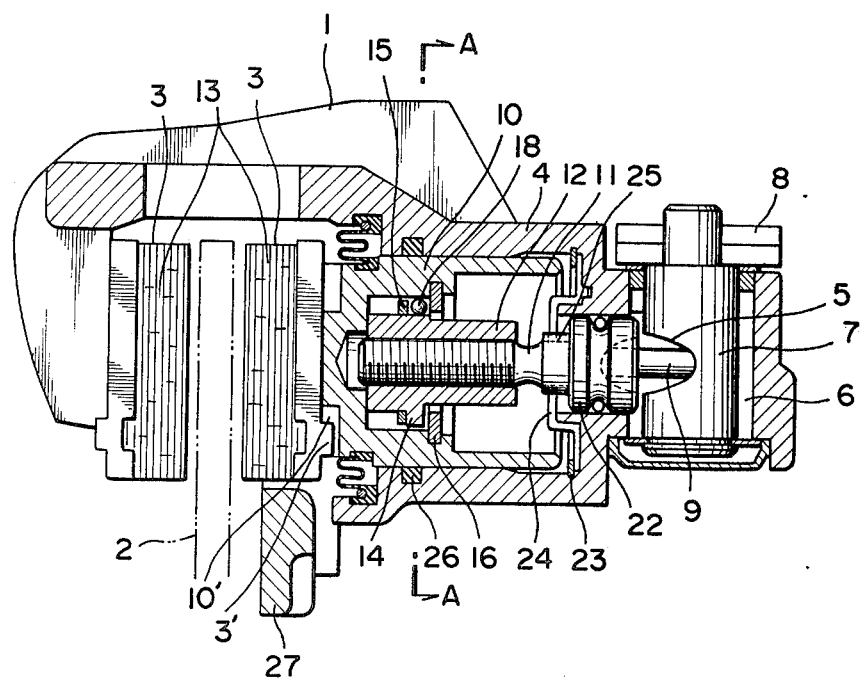
FIG. 1 illustrates a sectional view of a disc brake for the present invention.

FIG. 1 illustrates an embodiment of a disc brake of the present invention in which a service brake operating mechanism comprises a support 27 being fixed to a stationary element of a vehicle, a caliper 1 being slidably supported by the support 27, friction pads 3 interposing a disc 2 connected to a wheel and pressing the disc 2 at both sides and a fluid pressure cylinder 4 of operating one of the friction pads 3 so as to effect a braking; and a parking brake operating mechanism comprises a spindle 7 being provided with a cam groove 5 in a circumferential direction and rotatably supported by a bearing 6, a lever 8 of rotating the spindle 7 and a connecting like 9 being in contact with the cam groove 5, and further the parking brake operating mechanism is connected to a piston 10 of the cylinder 4 through a connecting rod device mentioned below to complete a parking brake.

In this invention, the connecting rod device mentioned above between the parking brake operating mechanism and the piston 10 of the cylinder 4 comprises a connecting link 9, an adjusting bolt 11 being connected with the connecting link 9 and a sleeve nut 12 being threadedly connected with the adjusting bolt 11 through a multiple thread screw.

The rotation of the sleeve nut 12 aforementioned is allowed in a direction of compensating wear of the linings 13 of the friction pads 3 but limited in the reverse direction of the compensation by a stopping means of rotation.

The stopping means of rotation comprises the following components. The sleeve nut 12 is provided with a plurality of projections 14 and inclined surfaces 12' on a circumference thereof. The inclined surface 12' and a circumferentially inner surface of the piston 10 constitute a wedge 17. A spring 19 pushes a ball 18 such that the ball 18 engages into the wedge 17. An annular pedestal 15 is fixed to the sleeve nut 12. A thrust washer 16 is fixed to the piston 10 by cauking. A protrusion 3' provided on one of the friction pads 3 engages a groove 10' of the piston 10 to prevent a rotation of the piston 10. In such an arrangement, the rotation of the sleeve nut 12 is prevented in a direction of an arrow 20 and allowed in a direction of an arrow 21 of FIG. 2.

The adjusting bolt 11 is provided with a large diameter portion 22 which is slidable in an inner surface of an end of the cylinder 4 located at the side of the connecting line 9 as shown in FIG. 1.

The adjusting bolt 11 aforementioned is provided with a groove 25 in an axial direction which engages a stopper plate 24 being fixed to the cylinder 4 by a circular clip 23 fitted to an end of the cylinder 4 so that the rotation of the adjusting bolt 11 is prevented relative to the cylinder 4.

The operation of the disc brake in the aforementioned arrangement will be explained.

A. The adjustment of a clearance between the friction pads and the disc (when the disc is braked during the operation of the fluid pressure operating mechanism for the service brake)

When a fluid pressure is introduced into the cylinder 4, the piston 10 slides toward left in FIG. 1 within the cylinder 4 by the pressure but the adjusting bolt 11 remains at the position shown in FIG. 1 because of a force applied toward right by the pressure.

Figure 2:
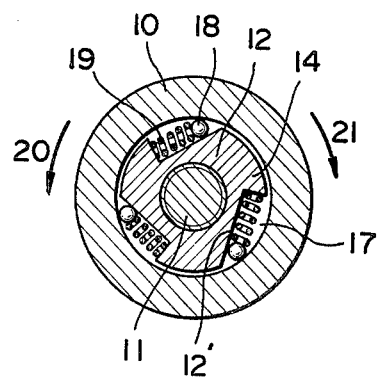
FIG. 2 is a sectional view across a line A-A' indicated in FIG. 1.

Under these circumstances, if the wear of the linings 13 of the friction pads 3 exceeds a predetermined amount, the moving force of the piston 10 is transmitted to the sleeve nut 12 through the balls 18 provided with a function of a thrust bearing such that the sleeve nut 12 rotates in the arrow 21 of FIG. 2 and moves toward left relative to the adjusting bolt 11.

While, if the fluid pressure applied to the piston 10 is released, the piston 10 receives a force acting toward right of the figure owing to a restoring force of a seal 26 and returns to the position that the bottom of the piston 10 engages the end of the sleeve nut 12 as shown in FIG. 1. Under these circumstances, a clearance is created between the thrust washer 16 and the balls 18, thereby allowing the springs 19 restore and the balls 18 engage the wedges 17 again. Thus, the piston 10 moves toward left relative to the cylinder 4 so that the clearance between the friction pads 3 and the disc 2 is adjusted regularly.

B. The operation of the parking brake (when the disc is braked during the operation of the mechanical operating mechanism for the parking brake)

When the lever 8 is rotated by an exterior force, the spindle 7 rotates so as to allow the cam groove 5 push the connecting link 9 toward left of the figure in such a manner that the connecting link 9 pushes the adjusting bolt 11, the sleeve nut 12 being threadedly connected with the adjusting bolt 11, the piston 10 and further one of the friction pads 3 to apply a braking force to the disc 2. The reaction of the braking force to the disc 2 moves the caliper 1 toward right so as to allow the other one of the friction pads 3 engage the disc 2 to complete the braking operation.

Under these circumstances, a turning effect generates on the sleeve nut 12 in a direction of the arrow 20 of FIG. 2 due to a lead angle of the multiple thread screw but is limited in this turning direction by the balls 18 being taken into the wedges 17 by the springs 19 so that the sleeve nut 12 does not rotate.

When the linings 13 of the friction pads 3 are worn more than a predetermined amount, the clearance between the friction pads 3 and the disc 2 is adjusted according to the wear amount of the linings 13 as mentioned in the paragraph A. above and, accordingly, the thread connection between the adjusting bolt 11 and the sleeve nut 12 is in a condition of rendering the firction pads 3 apply a predetermined braking force to the disc 2 through a predetermined stroke of the lever 8 during the operation of the parking brake.

As mentioned above, the present invention relates to a disc brakke concurrently provided with a mechanical parking brake wherein a lever stroke of a parking brake remains at a predetermined stroke even when linings of friction pads are worn more than a predetermined amount in such a manner that a clearance between the friction pads and a disc is automatically adjusted during the operation of a fluid pressure operating mechanism for a service brake.

Furthermore, since the balls 18 are forcibly taken into the wedges during the operation of the parking brake, the sleeve nut 12 is not retracted and the present invention, therefore, effectively prevents an increase of a working stroke of the parking lever due to the retraction of the conventional sleeve nut.

What is claimed is:

1. A disc brake comprising:
    a friction pad being engageable with a disc to be braked;
    a piston being slidable within a cylinder and enabling said friction pad to engage said disc by a fluid pressure;
    an adjusting bolt;
    a sleeve nut being connected with said adjusting bolt by screw threads and engageable with said piston on a release of brake;
    a connecting means for transmitting a moving force of said piston toward said disc to said sleeve nut; and
    a stopping means of rotation for allowing a forward rotation of said sleeve nut toward said disc and limiting a retracting rotation of said sleeve nut from said disc which comprises wedge means consisting of inclined surface provided on an outer circumference of said sleeve nut and a circumferentially inner surface of said piston, balls provided between said piston and said sleeve nut function as thrust bearing in said connecting means, and spring members pressing said balls to said wedge means for engagement therebetween.

2. A disc brake as defined in claim 1 wherein said spring members are interposed between said balls and said sleeve nut.

3. A disc brake as defined in claim 1 wherein said adjusting bolt is applied with an exterior force of causing a movement toward said disc.

4. A disc brake as defined in claim 3 wherein a rotation of said adjusting bolt is limited by means of an engagement between a stopper plate fixed to said cylinder and said adjusting bolt.

* * * * *